(12) United States Patent
Chauvin et al.

(10) Patent No.: US 11,997,060 B1
(45) Date of Patent: May 28, 2024

(54) APPARATUS, SYSTEMS, AND METHODS FOR THIRD-PARTY INFORMATION DISPLAY IN A USER INTERFACE IN A MEDICAL COMPUTER SYSTEM ENVIRONMENT

(71) Applicant: ALLSCRIPTS SOFTWARE, LLC, Chicago, IL (US)

(72) Inventors: George A. Chauvin, Ferrisburgh, VT (US); Thomas A. Hartman, Lake Wylie, SC (US)

(73) Assignee: Allscripts Software, LLC, Chicago, IL (US)

( * ) Notice: Subject to any disclaimer, the term of this patent is extended or adjusted under 35 U.S.C. 154(b) by 0 days.

(21) Appl. No.: 16/261,265

(22) Filed: Jan. 29, 2019

(51) Int. Cl.
*H04L 51/046* (2022.01)
*H04L 51/226* (2022.01)
*H04L 67/53* (2022.01)
*H04L 67/55* (2022.01)

(52) U.S. Cl.
CPC .......... *H04L 51/046* (2013.01); *H04L 51/226* (2022.05); *H04L 67/53* (2022.05); *H04L 67/55* (2022.05)

(58) Field of Classification Search
CPC ....... H04L 51/046; H04L 51/26; H04L 67/20; H04L 67/26
USPC .................................................. 709/206, 224
See application file for complete search history.

(56) References Cited

U.S. PATENT DOCUMENTS

| | | | | |
|---|---|---|---|---|
| 2004/0078231 | A1* | 4/2004 | Wilkes | G16H 70/20 705/2 |
| 2013/0297680 | A1* | 11/2013 | Smith | H04L 67/535 709/217 |
| 2015/0154361 | A1* | 6/2015 | Barsoum | G16H 80/00 705/3 |
| 2016/0232490 | A1* | 8/2016 | Mountz | G06Q 10/083 |
| 2017/0041942 | A1* | 2/2017 | Wallentin | H04W 72/1289 |
| 2017/0358181 | A1* | 12/2017 | Moussette | G08B 6/00 |
| 2019/0179608 | A1* | 6/2019 | Kothari | G10L 15/1815 |
| 2019/0355455 | A1* | 11/2019 | Mander | G16H 15/00 |

FOREIGN PATENT DOCUMENTS

| | | | | |
|---|---|---|---|---|
| CN | 108268251 | * | 7/2018 | |
| WO | WO-2014169616 | A1 * | 10/2014 | H04L 67/101 |

* cited by examiner

*Primary Examiner* — David R Lazaro
*Assistant Examiner* — Mariegeorges A Henry
(74) *Attorney, Agent, or Firm* — Peter Zura; LOZA & LOZA, LLP

(57) ABSTRACT

Technologies and techniques for providing third party notifications within a workspace on a processing device in medical computer system. The third party notifications are effectuated using a third party information manager that monitors inputs or changes to system information, such as the information that is pertinent to a currently displayed workspace, and then obtain third party messaging related to these inputs or changes. Additionally, a display decision manager is used to then determine the manner of displaying the third party messaging in the workspace based on either a determined priority of the messaging or the current content of the workspace. This selective managing of the third party messaging affords customization to the system that mitigates user alert fatigue caused by simply allowing all messages to be displayed.

18 Claims, 10 Drawing Sheets

APPARATUS, SYSTEMS, AND METHODS FOR THIRD-PARTY INFORMATION DISPLAY IN A USER INTERFACE IN A MEDICAL COMPUTER SYSTEM ENVIRONMENT

FIELD OF TECHNOLOGY

The present disclosure is directed to technologies and techniques for providing display of third party information in a user interface in a medical computer system environment. More specifically, the present disclosure is directed to the specific times and ways for displaying third party information such as Clinical Decision Support (CDS) Hooks in a workspace.

BACKGROUND

Medical computer systems have become critical aspects of modern-day health care, and include systems such as hospital information systems (HIS s), health information management (HIM) systems, electronic health record (EHR) systems and associated health information technology (HIT) that may incorporate aspects of medical record systems, medical imaging, personal health records, and patient tracking systems. These system architectures have been configured using a single level platform and/or a plurality of levels (e.g., government level, territory level, and patient carrying level) and are generally supported in client-server architectures for networking and processing.

For many medical record systems, third party information providers, such as Clinical Decision Support (CDS) Hooks, are increasingly being integrated into such systems. The third party providers offer notifications related to current workspace items and are increasingly becoming an important part of clinician workflow when using medical record systems. In the case of CDS Hooks, in particular, this is a third party application program interface (API) that may be integrated within and/or used with a medical record system where the API intercepts or "hooks" function calls, events, or messages occurring in the medical record system and, based on the data particular to those calls, events, or messages, determines relevant notifications related thereto that may be made available to a user. Typically, however, there is not a standard way to display and interact with such third party notifications.

SUMMARY

Various apparatus, systems and methods are disclosed herein relating to workspace navigation in a processing device operating environment including providing status indication for segmented controls.

In some illustrative embodiments, an apparatus for providing third party notifications for a processing device in a healthcare record system is disclosed. The apparatus includes a processor and a memory operatively coupled to the processor. Furthermore, the apparatus includes a workspace manager circuitry configured to generate a workspace for the processing device, and a third party information manager configured to monitor inputs or changes to system information within the processing device and obtain third party messaging related to the inputs or changes to the system information. Moreover, the apparatus includes a notification display decision manager configured to determine the manner of displaying the third party messaging in the workspace based on at least one of a determined priority of the third party messaging and content of a current workspace.

In other illustrative embodiments, a method for providing third party notifications for a processing device in a healthcare record system as disclosed. The method includes generating a workspace for the processing device and monitoring inputs or changes to system information within the processing device and obtaining third party messaging related to the inputs or changes to the system information with a third party information manager. Furthermore, the method includes determining the display of the third party messaging in the workspace based on at least one of a determined priority of the third party messaging and a content of a current workspace.

In yet other illustrative embodiments, a non-transitory computer readable media containing computer executable instructions for performing a method to display third party messages in a workspace on a processing device is disclosed. The media includes code for generating a workspace for the processing device, and code for monitoring inputs or changes to system information within the processing device. Additionally, the media includes code for obtaining third party messaging related to the inputs or changes to the system information with a third party information manager, and code for determining the display of the third party messaging in the workspace based on at least one of a determined priority of the third party messaging and a content of a current workspace.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
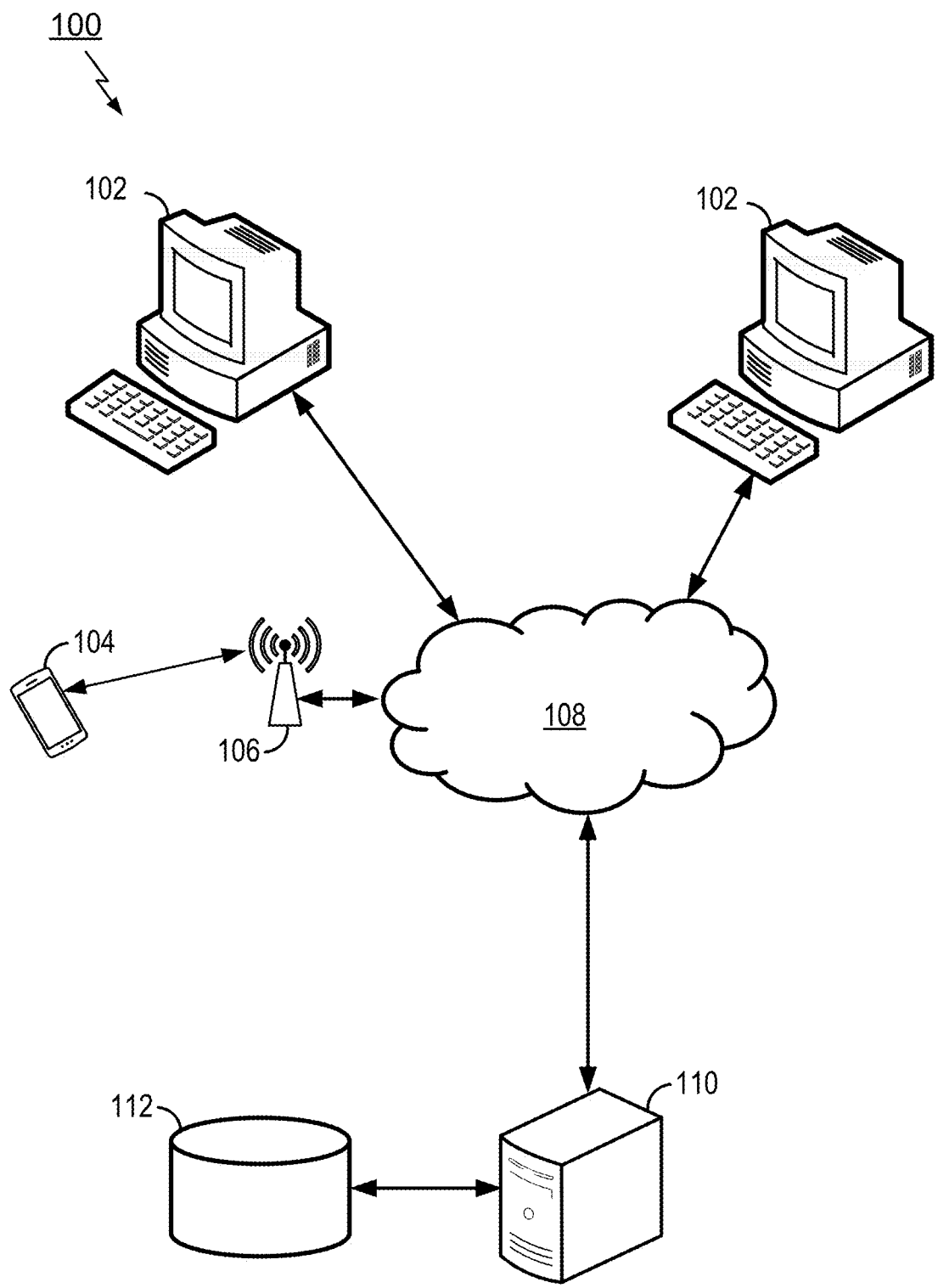
FIG. 1 illustrates a simplified view of a processor-based computer system configured to provide system such as an electronic health record system.

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C #, Java, ActionScript, Swift, Kotlin, Xcode, Objective-C, Javascript, CSS, XML, etc.). Furthermore, the term "information" as used herein is to be understood as meaning digital information and/or digital data, and that the term "information" and "data" are to be interpreted as synonymous.

In addition, while conventional hardware components may be utilized as a baseline for the apparatuses and systems disclosed herein, those skilled in the art will recognize that the programming techniques and hardware arrangements disclosed herein, embodied on tangible mediums, are configured to transform the conventional hardware components into new machines that operate more efficiently (e.g., providing greater and/or more robust data, while using less processing overhead and/or power consumption) and/or provide improved user workspaces and/or toolbars for human-machine interaction.

It is noted that as third party information and notification providers such as CDS Hooks become an accepted standard for electronic health record integration points, the user interfaces used to display and interact with the CDS Hook notifications will become increasingly important for clinician workflow. Although technical messaging standards exist to transport CDS Hook-based messages to electronic healthcare record systems, for example, methods and apparatus for displaying the information to system users in more useful and meaningful ways has yet to be developed. Accordingly, the present disclosure provides systems, methods, and apparatus for displaying third party information such as CDS Hook information that is scalable across various workspaces within an electronic heath record system, and also may be applicable to other clinical applications.

Additionally, it is noted that it currently known to provide Clinical Decision Support (CDS) information at the point of care (POC) as close to the workflow as possible without being intrusive. In some systems, this provision of information is based on suggestions in the CDS Hooks specification (e.g., draft form of v 1.0), which allows for innovation on various platforms by both internal and external parties. In particular, the present disclosure provides various user-interface mechanisms for displaying the third party information (e.g., CDS information) that mitigate the problem of provider "alert-fatigue" by allowing electronic healthcare records system to be configured to allow selection between interruptive or passive notifications based on third party parameter (e.g., CDS Hook parameters) that best match a user goal for a particular workflow.

Turning to FIG. 1, a system 100 is shown for generating workspaces for a computing environment in a medical records computer system, for example. The system 100 may include one or more computing devices 102, which may be workstations, personal computers (PCs), laptops, tablets, etc., that are coupled to a computer network 108. Additionally, the system 100 may include wireless access points (e.g., AP 106) for wireless communication with further computing devices 104. A server 110 may also be communicatively coupled to the network 108 and communicate with any of computing devices 102, 104. While only a few computing devices are shown in the figure, those skilled in the art will recognize that any number of suitable computing devices may be coupled to network 108. Similarly, server 110 may be configured as a stand-alone server, or may be part of a server network that includes a plurality of server, or a cloud server network. Server 110 may be coupled to a central storage database(s) 112, that stores data associated with the medical records system, including data concerning workspaces and controls. As will be explained in further detail below, the data from database 112, as well as data from computing devices 102 and 104 may be processed by server 110 to provide computer workspaces and toolbars including sequence controls and allow for third party notifications that may relate to a particular viewed workspace or domain.

Figure 2:
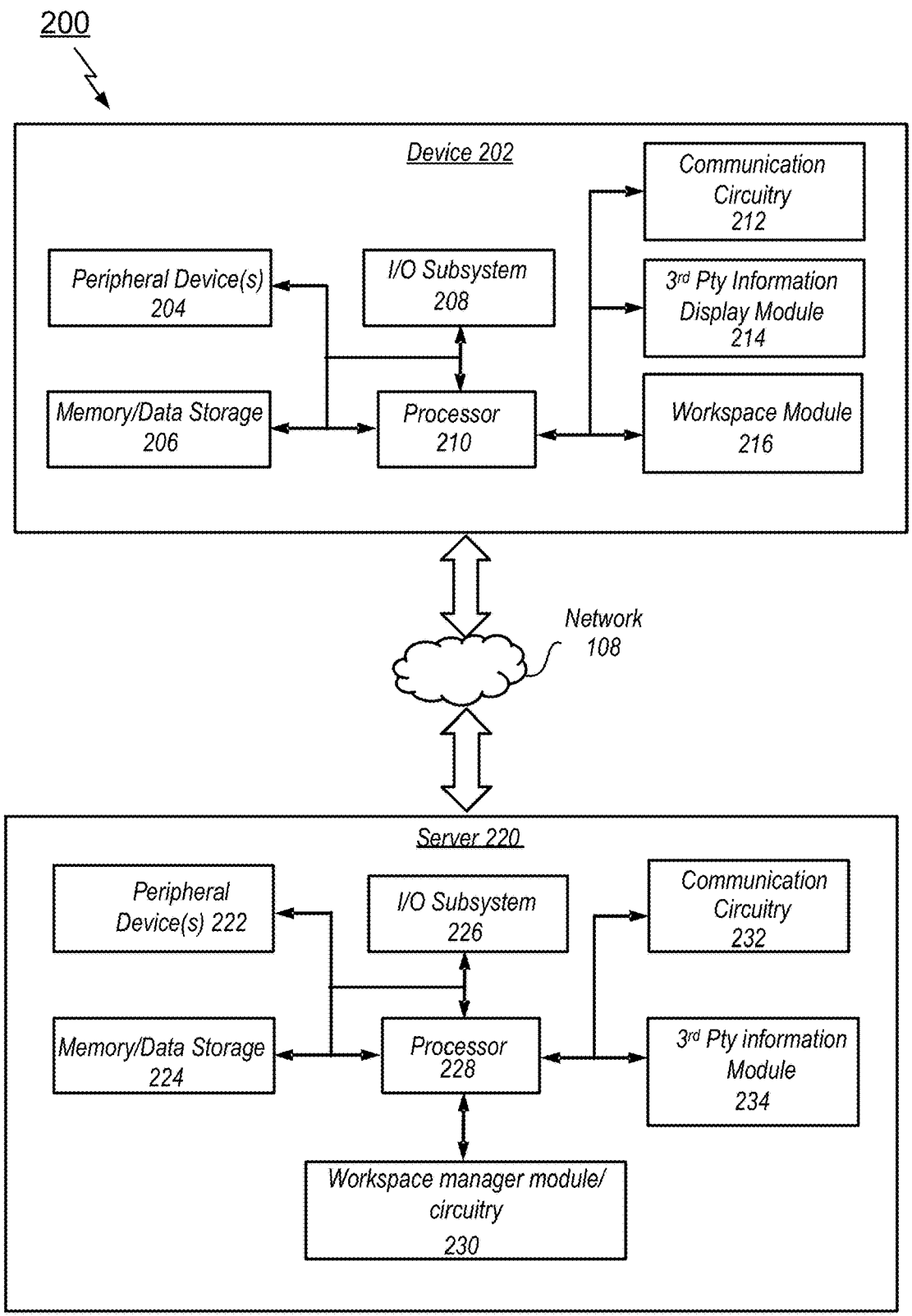
FIG. 2 schematically illustrates an operating environment for processing devices and a server communicatively coupled to a network for processing data, such as segmented control data, under an illustrative embodiment.

FIG. 2 shows an operating environment for a system 200 that includes a processing device 202, which may be configured as any of computer devices 102, 104, and a server 220, which may be configured as server 110, communicating via the network 108, wherein the system is configured to provide customized computer workspaces for various different system operations under an illustrative embodiment. In the illustrative embodiment, the processing device 202 includes a processor 210 or processor circuitry, one or more peripheral devices 204, memory/data storage 206, communication circuitry 212, a third party information display module 214, and a workspace module 216.

Workspace module 216 is configured to generate workspaces for device 202 that may include, but is not limited to, segmented controls, toolbars, interfaces, dialog, fly-out or pop-up boxes, and other formatting related to a medical application being executed on device 202. The workspace module 216 may be configured to receive manual inputs and also receive automatically generated workspace data including data received from the third party information display module 214, which is configured to receive third party notifications and other information and display alerts in the workspace. In some illustrative embodiments, third party information display module 214 and workspace module 216 may be incorporated into memory/data storage 206 with or without a secure memory area, or may be a dedicated component, or incorporated into the processor 210. Of course, processing device 202 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 206, or portions thereof, may be incorporated in the processor 210 in some embodiments.

The processor 210 may be embodied as any type of processor currently known or developed in the future and capable of performing the functions described herein. For example, the processor 210 may be embodied as a single or multi-core processor(s), digital signal processor, microcontroller, or other processor or processing/controlling circuit. Similarly, memory/data storage 206 may be embodied as any type of volatile or non-volatile memory or data storage currently known or developed in the future and capable of performing the functions described herein. In operation, memory/data storage 206 may store various data and software used during operation of the processing device 210 such as access permissions, access parameter data, operating systems, applications, programs, libraries, and drivers.

Memory/data storage 206 may be communicatively coupled to the processor 210 via an I/O subsystem 208, which may be embodied as circuitry and/or components to facilitate input/output operations with the processor 210, memory/data storage 206, and other components of the processing device 202. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 210, memory/data storage 206, and other components of the processing device 202, on a single integrated circuit chip.

The processing device 202 includes communication circuitry 212 (communication interface) that may include any number of devices and circuitry for enabling communications between processing device 202 and one or more other external electronic devices and/or systems. Similarly, peripheral devices 204 may include any number of additional input/output devices, interface devices, and/or other peripheral devices. The peripheral devices 204 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 220 may be embodied as any type of server (e.g., a web server, etc.) or similar computing device capable of performing the functions described herein. In the illustrative embodiment of FIG. 2 the server 220 includes a processor 228, an I/O subsystem 226, a memory/data storage 224, communication circuitry 232, and one or more peripheral devices 222. Components of the server 220 may be similar to the corresponding components of the processing device 202, the description of which is applicable to the corresponding components of server 220 and is not repeated herein for the purposes of brevity.

The communication circuitry 232 of the server 220 may include any number of devices and circuitry for enabling communications between the server 220 and the processing device 202. In some embodiments, the server 220 may also include one or more peripheral devices 222. Such peripheral devices 222 may include any number of additional input/output devices, interface devices, and/or other peripheral devices commonly associated with a server or computing device. The server 220 also includes a third party information manager/module/circuitry 234, which is responsible for processing data from or sending data to third party information display module 214 in device 202, as well as managing the receipt of third party information from a third party provider, such as CDS Hooks. The third party information manager/module/circuitry 234 also communicates with workspace manager module 230 in order to generate workspaces having desired displays of the notifications from the third party provider, as will be discussed in more detail herein. Additionally, in certain aspects modules 230 and 234 are configured to interface such that the third party notifications are selectively displayed based on contextual information about the state of the workspace. That is, the notifications may or may not be displayed based on whether the notifications are sufficiently relevant to the current goals/tasks of a current workspace, as will also be discussed later herein.

Under an illustrative embodiment, when users interact with software being executed on device 202, they may add, modify, or consume/view data related to a workspace, toolbar, and/or the software data itself. Additionally, based on user interactions, the third party information manager/module/circuitry 234 will generate notifications that are sent to the workspace manager module 230, which may be configured to modify an existing workspace and/or toolbars based on the notifications, and transmit the modified workspace to workspace module 216, which loads the modified workspace into device 202 during operation.

The disclosed configuration is particularly advantageous for customizing workspaces in a medical software environment, by allowing the system (e.g., 200) to customize workspaces for users. The customization may be based on any number of factors including, but not limited to, the medical position of the user (e.g., IT staff, nurse, doctor, technician, etc.), the medical process being used or reviewed during software execution (e.g., medical imaging, pharmaceutical, accounting), location of user, user team group, and so forth. As users from an organization enter customization data or selections during software use, the system (e.g., 200) may customize the workspaces to provide optimal display, positioning and functionality of the workspace to each group according to their needs and/or preferences.

In the illustrated embodiment, communication between the server 220 and the processing device 202 takes place via the network 108 that may be operatively coupled to one or more network switches (not shown). In one embodiment, the network 108 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 202 and the communication circuitry 232 of the server 220 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 108 may include any number of additional devices, such as additional computers, routers, and switches, to facilitate communications between the processing device 202 and the server 220.

Figure 3:
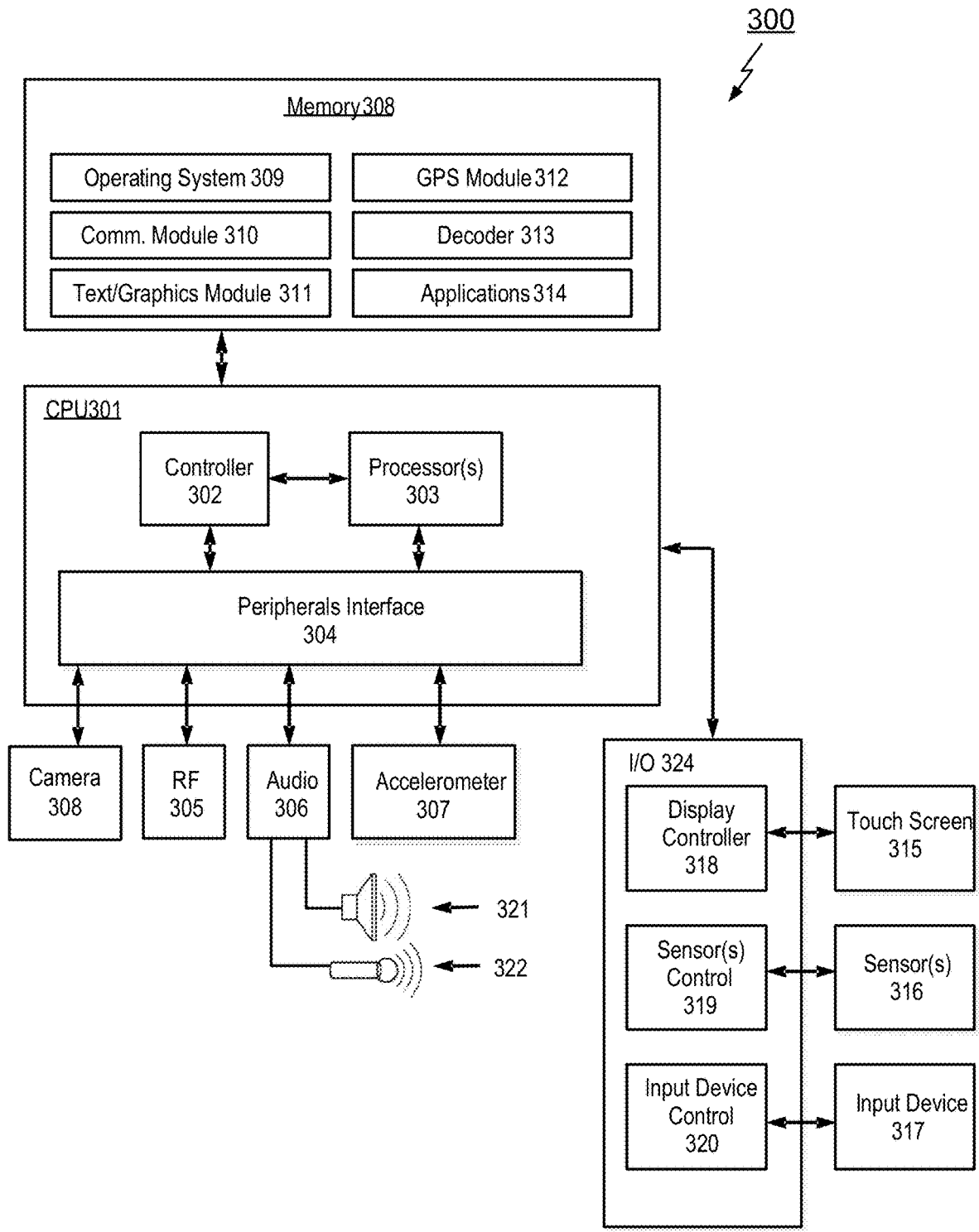
FIG. 3 schematically illustrates an operating environment for a processing device configured to process data, such as segmented control data, under an illustrative embodiment.

FIG. 3 is an exemplary embodiment of a computing device 300 (such as processing devices 102, 104, 202), and may be a personal computer, smart phone, tablet computer, laptop and the like. Device 300 may include a central processing unit (CPU) 301 (which may include one or more computer readable storage mediums), a memory controller 302, one or more processors 303, a peripherals interface 304, RF circuitry 305, audio circuitry 306, accelerometer 307, speaker 321, microphone 322, and input/output (I/O) subsystem 324 having display controller 318, control circuitry for one or more sensors 319 and input device control 320. These components may communicate over one or more communication buses or signal lines in device 300. It should be appreciated that device 300 is only one example of a portable multifunction device, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 304, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include utterances from a speaker. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 306 and removable audio input/output peripherals, such as output-only headphones or a headset with both output (e.g., a headphone for one or both ears) and input (e.g., a microphone).

I/O subsystem 324 couples input/output peripherals on the device 300, such as touch screen 315, sensors 316 and other input/control devices 317, to the peripherals interface 304. The I/O subsystem 324 may include a display controller 318, sensor controllers 319, and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 315 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as heart rate sensors, touch sensors, optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 307, which may be operatively coupled to peripherals interface 304. Alternately, the accelerometer 307 may be coupled to an input controller 320 in the I/O subsystem 226. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.).

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including health monitoring software, sensor software, navigation software, mapping, address books/contact list, email, instant messaging, and the like.

Figure 4:
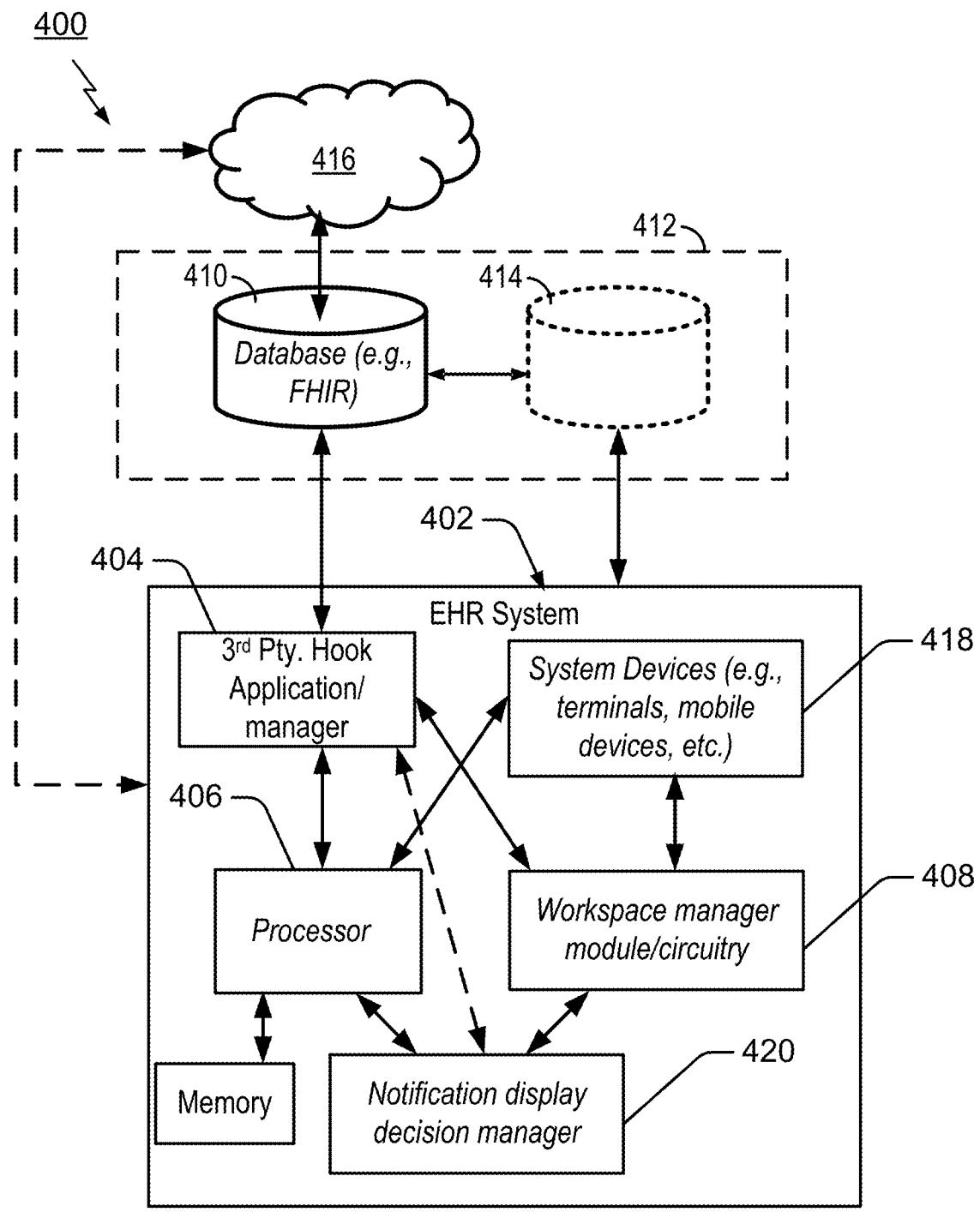
FIG. 4 shows another operating environment for an electronic healthcare record system utilizing a third party application or hook to display clinical decision support (CDS) notifications or information under an illustrative embodiment.

Turning to FIG. 4, a further exemplary electronic health record system 400 is illustrated including the use of an integrated third party information provider application (e.g., a hook application to hook information and notifications). In particular, the example of FIG. 4 illustrates a system 400 for a using an application such as CDS Hooks, but the disclosure is not limited to such and could be applied to various other third party information providers. It is noted that in the particular example of CDS Hooks, user activity inside an electronic health record (EHR) system, such as the system 402 (also 200 as shown in FIG. 2), will trigger the CDS Hooks application in real-time. As an example, the system 402 may include a third party hook application, API, manager, or circuitry 404 that is configured to be triggered by events occurring in the system 402. In particular, the third party hook application 404 may monitor a system processor 406 or a workspace manager circuitry 408, as examples, for various events occurring in the system 402. When the event occurs, the third party hook application 404 may access a database 410 that includes clinical decision notification related to the various events occurring. In an aspect, database 410 may be separate or merely a part of the system database as illustrated by lines 412 and/or communicatively coupled to another database 414, which may be the database for system 402. The application 404 is configured to pull data, information, or notifications (termed "CDS cards" for the CDS Hooks application, in particular). Additionally, the database 410 may receive updated third party information directly from a network 416, which may be the internet as an example, or via the system 402 accessing proprietary information via the internet as illustrated by a dashed line communicative coupling from the system 402 to the network 416. Information obtained with application 404 is sent either to the processor 406 or the workspace manager 408, which in turn send the information or notifications to system devices 418 (e.g., device 202 in FIG. 2).

In a specific example, a CDS Hooks application used as application 404 may be triggered during various events in the EHR system 402. In one example, a patient view, such as during the opening of a new patient record, may trigger the application 404 to pull notification data. Other triggers may include a medication prescribe operation when a new prescription is authored and entered into the EHR system 402. Yet a further trigger may include an order-review upon viewing pending orders for approval in the EHR system 402. In particular implementations, when a triggering activity occurs, the EHR 402 notifies each CDS service registered for the activity. These services then provide near-real-time feedback about the triggering event. Each service gets basic details about the EHR context via a context parameter of the hook, plus whatever service-specific data are required, with may be via a pre-fetch-template parameter.

In further aspects, it is noted that the database 410 may utilize Fast Healthcare Interoperability Resources (FHIR), which is a proposed standard created by the Health Level Seven International (HL7) health-care standards organization describing data formats and elements known as "resources" and third party application programming interfaces (API), such as application 404, for exchanging electronic health records. In certain aspects, FHIR uses a web-based suite of API technology, including HTTP-based RESTful protocol, HTML, and Cascading Style Sheets for user interface integration. Additionally, the application 404 may utilize a choice of JSON, XML or RDF for data representation, and Atom for results. FHIR facilitates interoperation between legacy health care systems in order to make it easy to provide health care information to health care providers and individuals on a wide variety of devices (e.g., computers, tablets, mobile phones, etc.) and allow third-party application developers to provide medical applications that may be easily integrated into existing systems.

Of further note, in CDS Hooks, in particular, the information or notifications are termed "CDS Cards," which are to be understood as being synonymous with the term "notifications" used herein. These cards provide decision support services representing discrete recommendations or suggestions that are presented to the user within the EHR 402. Each CDS service can return any number of cards in response to a particular hook. The cards may convey some combination of text (i.e., an information card), alternative suggestions (i.e., a suggestion card), and/or links to apps or reference materials (i.e., an app link card). A user may view these cards as they are integrated or embedded in the EHR 402, and may also interact with them in different ways, such as providing text for the user to read in the case of an information card, providing a button or clickable area to populate a suggested change into the EHR 402 in the case of suggestion cards, or provides a link to an app (e.g., a SMART app) where the user can supply details, step through a flowchart, or do anything else required to help reach an informed clinical decision.

The present disclosure further provides methods and apparatus for deciding when and how to display the notifications or CDS cards based on context of the workspace or information being displayed to a user of the system 402. Accordingly, the system 402 further includes a notification display decision manager 420 that is configured to decide when and how to displays the notifications and CDS cards.

Figure 5:
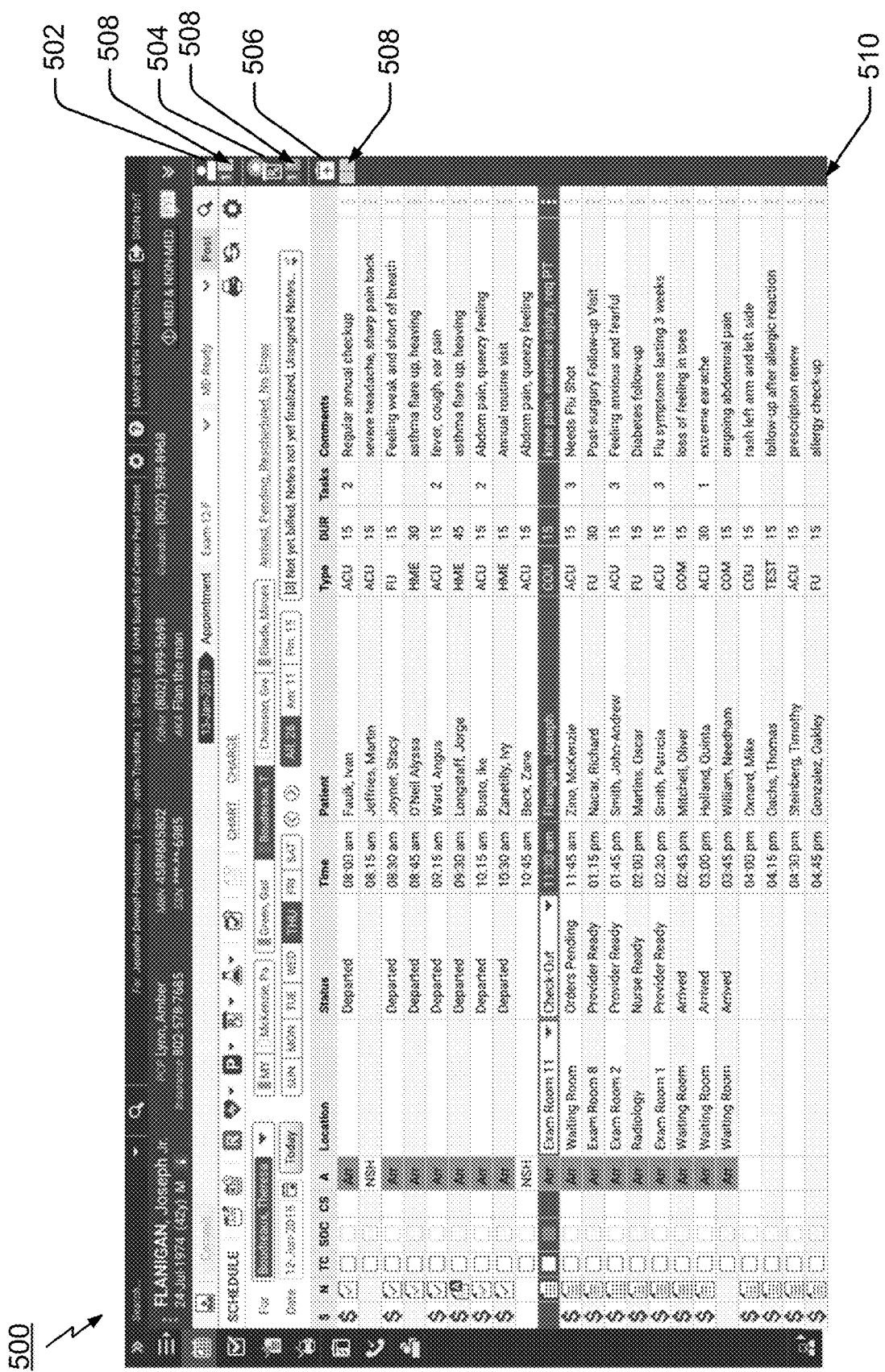
FIG. 5 shows an exemplary workspace display including $3^{rd}$ party notification information under an illustrative embodiment.

As an example of the display of notifications or CDS cards, FIG. 5 illustrates an exemplary workspace display 500 including 3rd party notification information under an illustrative embodiment. As may be seen in a portion of display 500, exemplary indicators are displayed for the three types of hooks in the CDS Hooks application discussed above, but it should be understood that the invention is not limited to such. Accordingly, display 500 illustrates a patient view alert icon 502, a prescription/medication view alert icon 504, and an order view alert icon 506. As the third party applications do not necessitate or specify how to display the notifications or cards, and because a user does not always wish to view every notification or card in all situations, the present invention provides for the minimized views shown, and further includes indicators (boxes or badges 508 as an example) that show notifications or cards have been received, and may even show the number of notifications. Additionally, as may be seen in FIG. 5, in certain aspects the alert icons or areas 502, 504, and 506 may be arranged in an alert bar 510 that can be placed at the frame of an EHR user interface, where the icons may serve as a launching mechanism, as well as being passive and required selection to launch viewing the third party notifications or messages.

In an aspect, the notification display decision manager 420 is configured to generate the information for these displayed alert icons 502, 504, 506 and the badges 508, and also decide whether or not to impose or overlay on the workspace 500 with an active pop-up (e.g., "Toaster" style alert) or fly-out message or a notification dependent on the context of workspace and the information being access/viewed by the user, rather than passive indication in a toolbar or an icon as shown in FIG. 5. According to certain aspects, the present methodology for displaying the third party information, notifications or alerts are configured to present the specific information at the point of care (POC) where the data that is most important to the clinical user of the EHR system will be actively displayed.

In the case of CDS Hooks, in particular, it is noted that the CDS Hook display mechanisms support rules that determine where CDS Hooks cards are rendered in in the workspace shown on the user interface (UI). The mechanisms may be based on card attributes where the CDS Hooks standard supports the following indicators: (1) Information, (2) Warning, and (3) a Hard-stop. Additionally, the presently disclosed systems may support interruptive or active alerts such as pop-up of "Toaster" alerts for CDS Hooks following a prioritization of hard-stop indicators for active alerts notifications (i.e., pop-ups or other overlaying messaging) according to a "hard-stop rule", whereas passive alert bar notifications are only provided for information and warnings. This prioritization and decision to show only certain higher priority CDS notifications serves to avoid "alert-fatigue" in the clinical user and is only to be interrupted for the most crucial or highest priority messages or notifications, with passive alerting via a motion-based icon display, as an example for the info and warnings.

Figure 6:
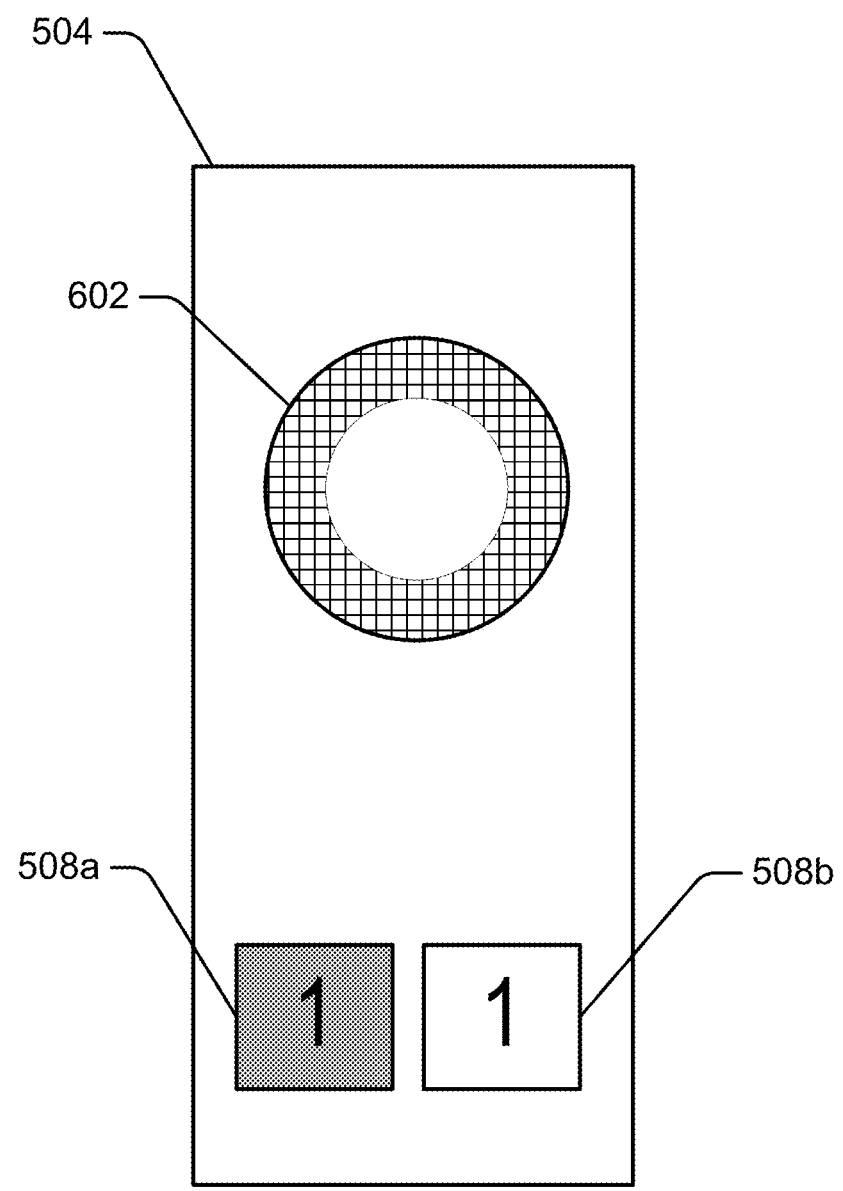
FIG. 6 shows an exemplary alert icon under an illustrative embodiment.

FIG. 6 shows an example of a passive style alert icon under an illustrative embodiment. In this example, the alert icon or area 504 from FIG. 5 is illustrated to show various features that may be included according to various aspects. In particular, the alert icon 504 may include an indicator area 602 that is configured to alert a user that new CDS notifications or messages are available for viewing. The indicator 602 may be a motion-based indicator that visually (or audibly) alerts the user that there are new CDS Hook notification messages to view, such as by blinking or a changed appearance (e.g., color). Moreover, the system may be configured such that the motion indicator 602 does not show once the user interacts with the alert icon 504 and has viewed the new CDS Hook message information.

Furthermore, the alert 504 may include badges 508 that are used to indicate the urgency or importance of what the CDS hook information will convey, as well as the number of messages. For example, badge 508a may provide an indication of an information message and the number of messages (i.e., 1 in this example), and badge 508b may provide an indication of a warning message and the number of messages of that type (i.e., 1 in this example). The badges 508 may also be configurable to be changed in appearance to indicate that messages are present, and revert back to a default appearance when the messages have been viewed and no new messages are present.

Figure 7:
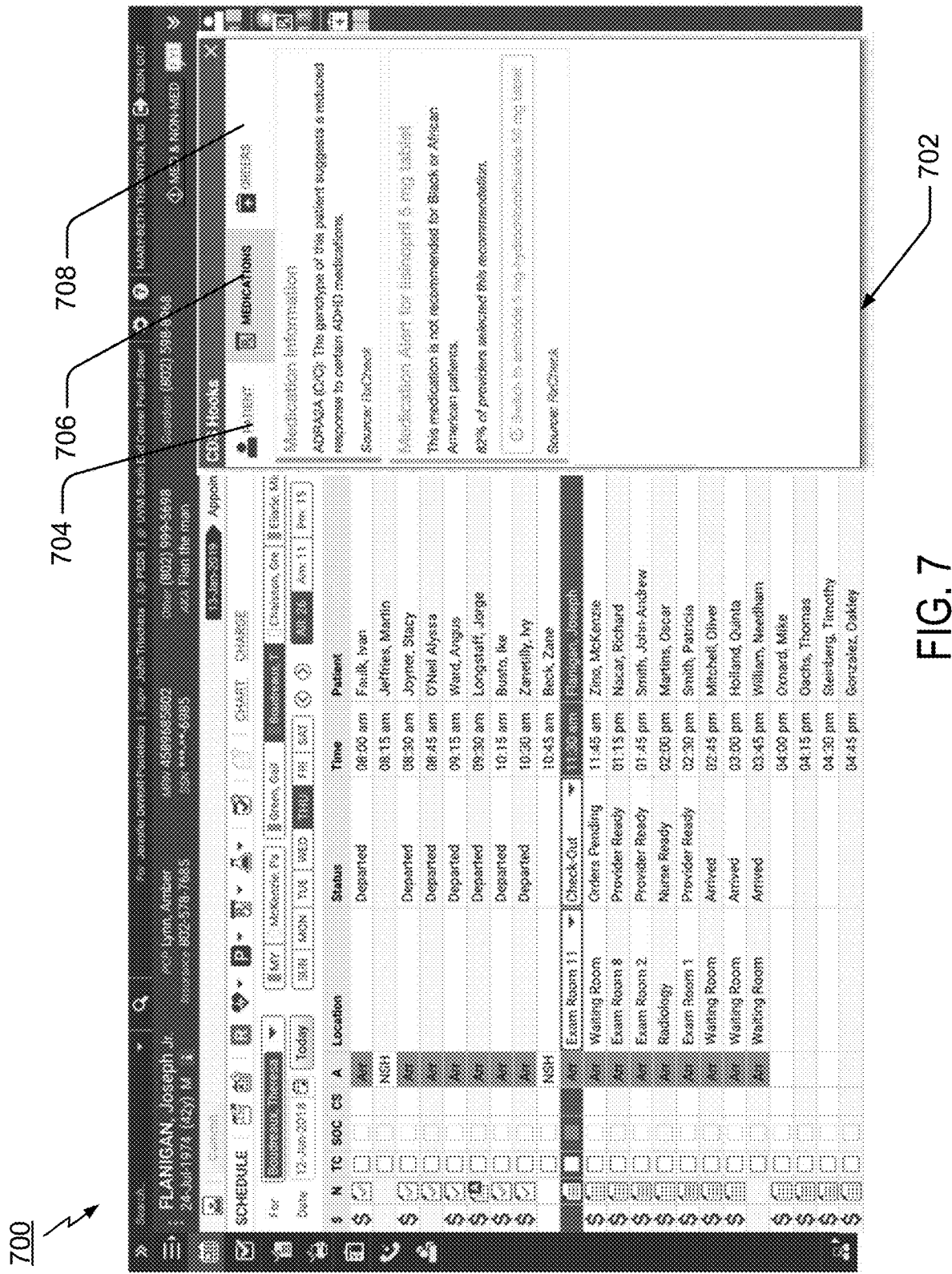
FIG. 7 illustrates a workspace display including a fly-out notification of third party provided information under an illustrative embodiment.

For certain third party provided information, messages, or notification that are classified of a first priority level (e.g., CDS hook information coded as 'Info' or 'Warning' as discussed above), the system may be further configured to support a fly-out area that will display a full view of the notifications or messages on demand, such as by a cursor click, hover, or touch of the alert icons 502, 504, or 506. FIG. 7 illustrates one example of a workspace display 700 including a fly-out notification of third party provided information under an illustrative embodiment. In the particular example of FIG. 7, the fly-out area 702 results from selecting one of the icon alerts 502, 504, and 506. In this particular example, the fly-out area 702 shows "Medication/Prescribe" CDS hook information (e.g., selection of alert icon or area 504). In further embodiments, the fly-out area may be configured with tabs 704, 706, and 708 that allow a user to conveniently select between the CDS Hooks categories or types while the fly-out area 702 is displayed rather than closing the fly-out and selecting another alert icon (e.g., icons 502 or 506 in this particular case).

Figure 8:
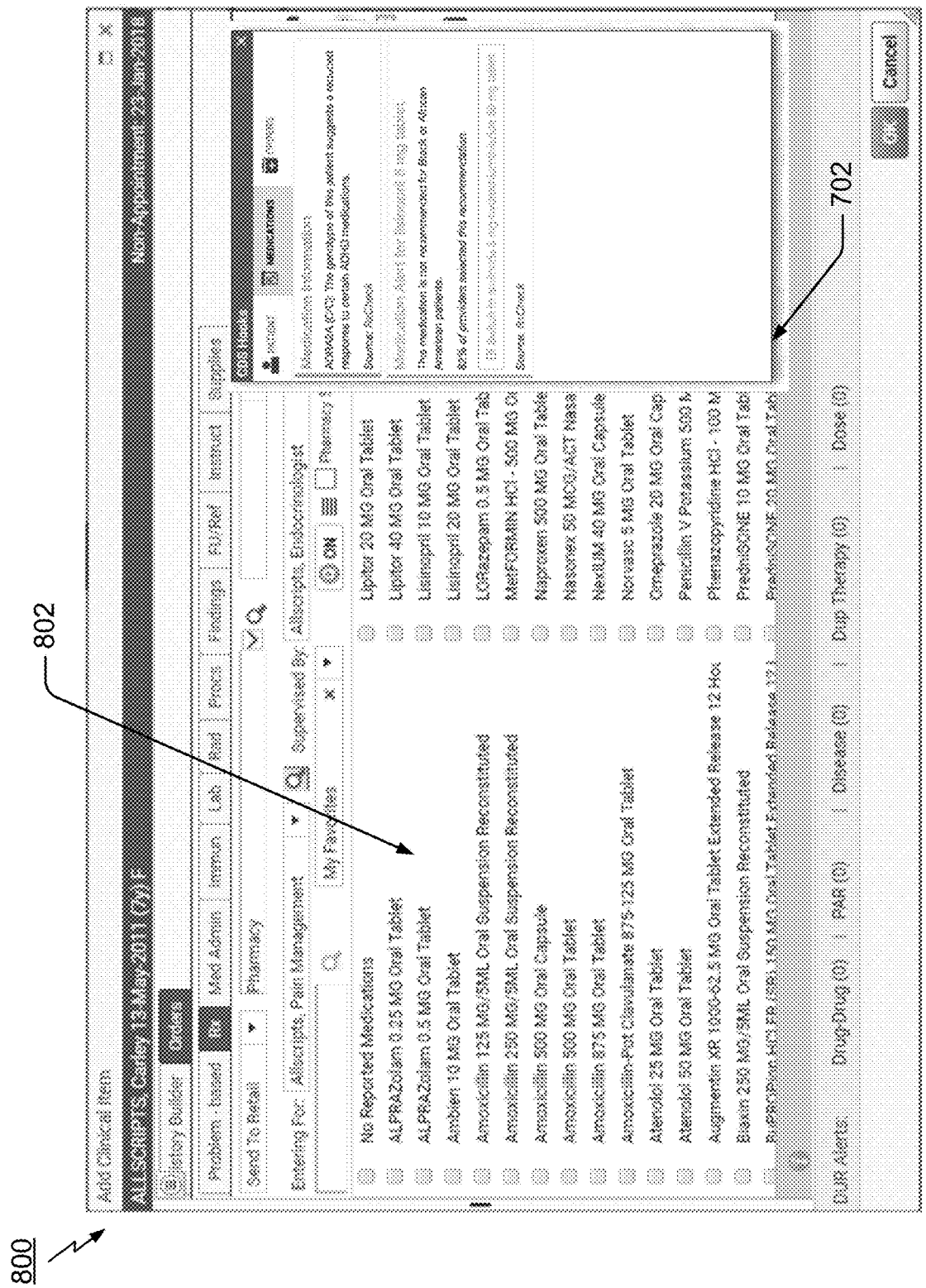
FIG. 8 illustrates another workspace display including a fly-out notification of third party provided information under an illustrative embodiment.

Additionally, it is noted that the present system may be configured to allow a user to link to other workspaces of the EHR system (e.g., system 200 or 400) based on the third party information notifications or messages being delivered. As an example, FIG. 8 illustrates another workspace display view 800 including the fly-out view 702 of third party provided information under an illustrative embodiment, but showing access to a different part or workspace 802 of the EHR system after selection of a message in the fly-out 702. The system is configured to display relevant information from the EHR system related to the third party information message or notification in the fly-out 702 that has been selected by a user. In this particular example, when a message in the fly-out 702 related to medications or prescriptions is selected by a user, the workspace view 802 is changed to display relevant medication information from a different part of the EHR system where the third party information is the most useful (i.e., in prescribing medication).

Figure 9:
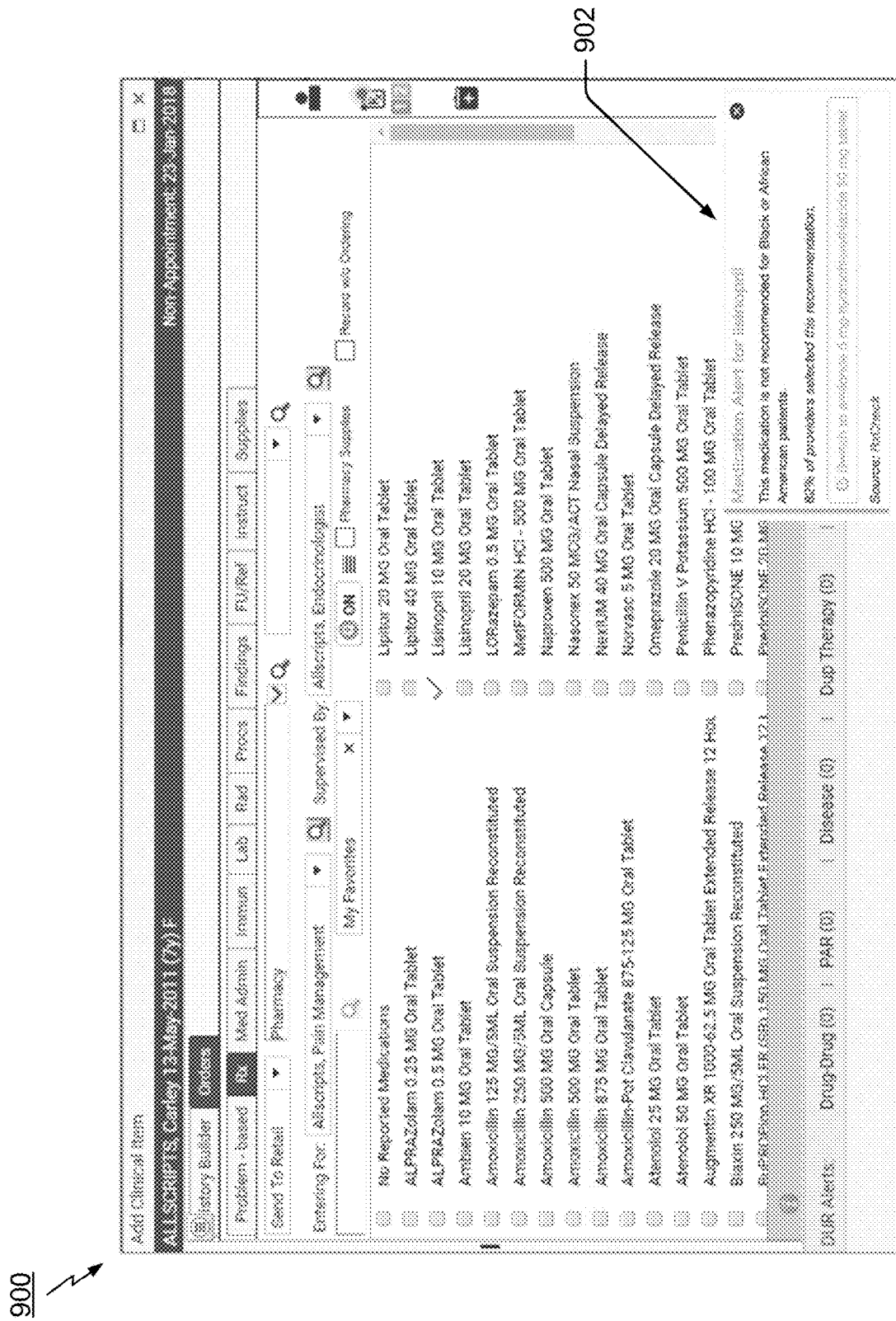
FIG. 9 illustrates another workspace display including a pop-up or toaster style notification of third party provided information under an illustrative embodiment.

As mentioned above, in cases where the third party information is determined either to be categorized as higher/highest priority or coded as a "Hard Stop", the system may be further configured to always display the message or notification without user input or selection. As an example of such display of the third party messages or notification, FIG. 9 illustrates another workspace display 900 including a pop-up notification 902 of the third party provided information (e.g., a toaster style pop-up that rises up from the bottom portion of a display). Additionally, the system may be configured to selectively fade out the pop-up after a predefined time period has elapsed, or, alternatively, configure the pop-up to force the user take an action to close the pop-up.

It is noted that in one aspect the various displays of third party information as shown in the examples of FIGS. 5-9, for example, may be accomplished with a specialized processor or circuitry configured as notification display decision manager 420 in FIG. 4. Additionally, the manager 420 may be configured to act in communication with other processors such as system processor 406 and/or workspace manager circuitry 408 to effectuate particular displays and EHR system workspace integration. Additionally, the manager 420 may be configured to receive the third party information directly from the third party hook application (e.g., 404) and execute message prioritization and decision making for the display of the third party messages and notifications.

Figure 10:
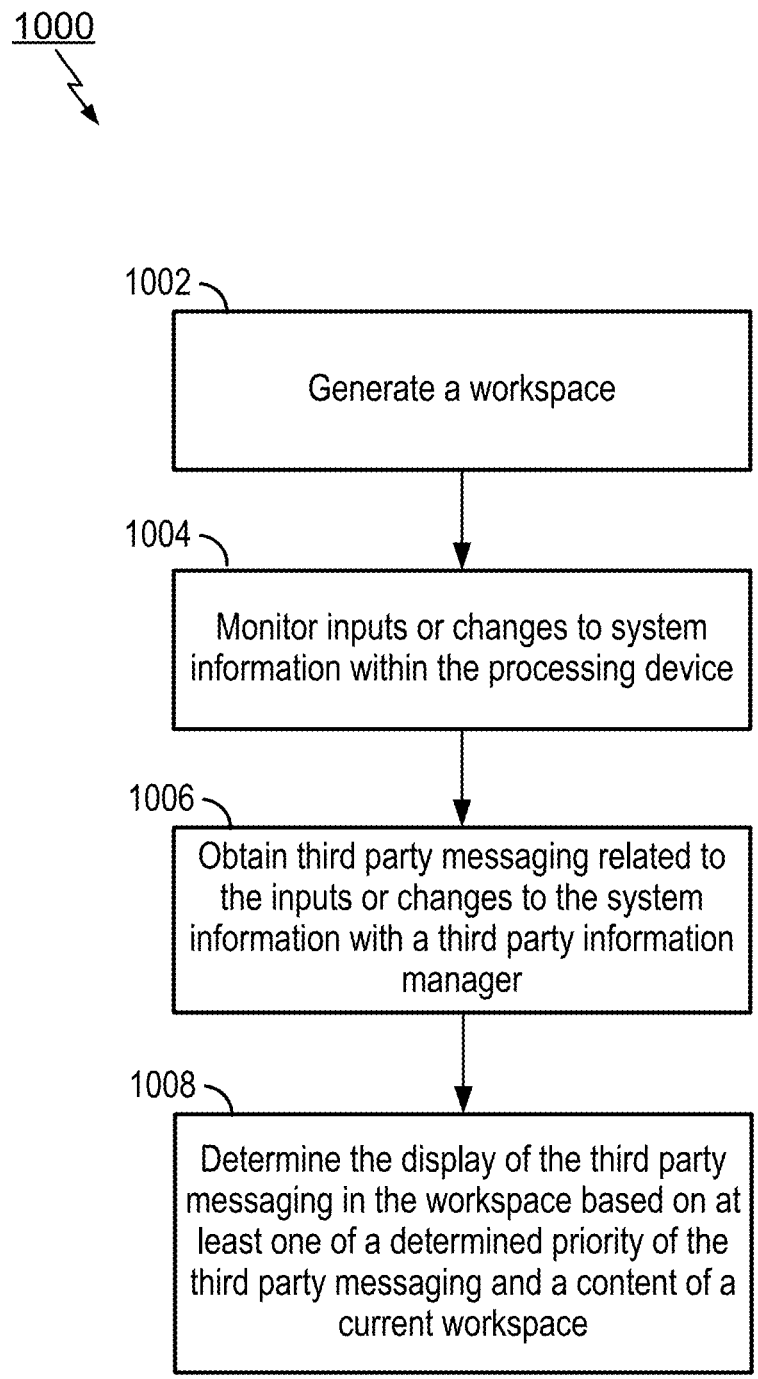
FIG. 10 illustrates a method for displaying notifications of third party provided information under an illustrative embodiment.

FIG. 10 illustrates a method 1000 for displaying notifications of third party provided information under an illustrative embodiment. Method 100 includes generating a workspace for the processing device as shown at block 1002. The process of block 1002 may be effectuated by the workspace manager circuitry 230 or 408 according to various examples. Method 1000 further includes monitoring inputs or changes to system information within the processing device as shown in block 1004. Furthermore, method 1000 includes obtaining third party messaging related to the inputs or changes to the system information with a third party information manager as shown in block 1006. The processes in blocks 1004 and 1006 may be implemented with the third party information managers 234 or 404 as examples.

Additionally, method 1000 includes determining the display of the third party messaging or the manner thereof in the workspace based on at least one of a determined priority of the third party messaging and a content of a current workspace as shown in block 1008. In an aspect, the processes of block 1008 may be effectuated with a display manager, such as managers, modules, or circuitries 214 or 420 as examples. Furthermore, the determined priority may include determining whether the third party messaging is important enough to display actively (e.g., a toaster pop-up) or passively (an alert indicator such as 504 shown in FIGS. 5 and 6) as was discussed above. Alternatively, the determination of how and when to display the third party messaging may be based at least in part on the content of the workspace. For example, if a particular screen of high importance is displayed in the workspace, the third party messaging may not be actively displayed but rather passively so (or delayed in time), even though in other workspaces the message would be of such import that the message would normally be displayed with a pop-up, for example.

In other aspects, method 1000 may include the third party information manager (e.g., 404) is configured to determine the type of inputs or changes to the system information and obtain the third party messaging from a database (e.g., 410) when the input or changes are present in the processing device (e.g., 406). Additionally, method 1000 may include determining a priority level of the third party messaging obtained by the third party information manager, and deciding the manner of displaying the third party messaging based on the determined priority level. It is noted here that the term "manner of displaying" as used herein and as found in the claims is meant to include when to display a third party message or notification and where to display the third party messaging (i.e., with an alert indicator such as 504 or actively with a pop-up such as 902), but may include also further specific features or parameters such as badges within an alert indicator, bar, or area and shown numbers of alerts within, as well as an active, blinking, or moving indicator (e.g., 602), an accompanying audible indicator, or combinations thereof, as well as further features not enumerated here but discussed within the present disclosure or equivalents thereof.

In other aspects, method 1000 may include determining the priority of the third party messaging is based on at least one of metadata or coding information within the third party messaging. Additionally, method 1000 may include displaying the third party messaging in the workspace with an alert indicator displayed in the workspace when the determined priority level is below a predetermined threshold, wherein the alert indicator is configured to allow a user to selectively view the third party messaging. Still further, method 1000 may include actively displaying the third party messaging when the determined priority level is above a predetermined threshold (e.g., displaying with a pop-up regardless of the workspace content when the priority level is high enough). In yet further aspects, the third party information manager used in effecting the method 1000 may include an application hook (e.g., CDS Hooks) that is configured intercept one or more of function calls, messages, or events being received or transmitted by the processing device.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:

1. An apparatus for providing clinical decision support (CDS) system notifications for a processing device in a healthcare record system, comprising;
   a processor;
   a memory, operatively coupled to the processor;
   a workspace manager circuitry configured to generate a workspace for the processing device;
   a CDS system information manager configured to monitor inputs or changes to system information within the processing device and obtain CDS system messaging related to the inputs or changes to the system information, wherein the CDS system information manager comprises a CDS application hook that is configured to be triggered by events occurring in the CDS system to intercept one or more of function calls, messages, or events being received or transmitted by the processing device, and wherein the CDS system information manager is configured to generate a context parameter of the CDS application hook; and
   a notification display decision manager configured to determine the manner of displaying the CDS system messaging in the workspace, based on the context parameter of the CDS application hook, a determined priority of the CDS system messaging and content of a current workspace.

2. The apparatus of claim 1, wherein the CDS system information manager is configured to determine the type of inputs or changes to the system information and obtain the CDS system messaging from a database when the input or changes are present in the processing device.

3. The apparatus of claim 1, wherein the notification display decision manager is configured to determine a priority level of the CDS system messaging obtained by the CDS system information manager, and decide the manner of displaying the CDS system messaging based on the determined priority level.

4. The apparatus of claim 3, wherein the notification display decision manager is configured to determine the priority of the CDS system messaging based on at least one of metadata or coding information within the CDS system messaging.

5. The apparatus of claim 3, wherein the notification display decision manager is configured to display the CDS system messaging in the workspace with an alert indicator displayed in the workspace when the determined priority level is below a predetermined threshold, the alert indicator allowing a user to selectively view of the CDS system messaging.

6. The apparatus of claim 3, wherein the notification display decision manager is configured to actively display the CDS system messaging in the workspace when the priority level is above a predetermined threshold.

7. A method for providing third party notifications for a processing device in a healthcare record system, comprising;
generating a workspace for the processing device;
monitoring inputs or changes to system information within the processing device and obtaining clinical decision support (CDS) system messaging related to the inputs or changes to the system information with a CDS system information manager, wherein monitoring inputs or changes comprises a CDS application hook that is configured to be triggered by events occurring in the CDS system to intercepting one or more of function calls, messages, or events being received or transmitted by the processing device via the CDS system information manager;
generating a context parameter of the CDS application hook via the CDS system information manager; and
determining the display of the CDS system messaging in the workspace based on the context parameter of the CDS application hook, a determined priority of the CDS system messaging, and a content of a current workspace.

8. The method of claim 7, wherein the CDS system information manager is configured to determine the type of inputs or changes to the system information and obtain the CDS system messaging from a database when the input or changes are present in the processing device.

9. The method of claim 7, further comprising:
determining a priority level of the CDS system messaging obtained by the CDS system information manager; and
deciding the manner of displaying the CDS system messaging based on the determined priority level.

10. The method of claim 9, wherein determining the priority of the CDS system messaging is based on at least one of metadata or coding information within the CDS system messaging.

11. The method of claim 9, further comprising displaying the CDS system messaging in the workspace with an alert indicator displayed in the workspace when the determined priority level is below a predetermined threshold, wherein the alert indicator is configured to allow a user to selectively view the CDS system messaging.

12. The method of claim 9, actively displaying the CDS system messaging when the determined priority level is above a predetermined threshold.

13. One or more non-transitory computer readable media containing computer executable instructions for performing a method to display clinical decision support (CDS) system messages in a workspace on a processing device, the media comprising:
code for generating a workspace for the processing device;
code for monitoring inputs or changes to system information within the processing device and obtaining CDS system messaging related to the inputs or changes to the system information with a CDS system information manager comprising a CDS application hook including a pre-fetch-template parameter, wherein the code for monitoring inputs or changes comprises code for intercepting one or more of function calls, messages, or events being received or transmitted by the processing device via the CDS system information manager triggered by events occurring in the CDS system to;
code for generating a context parameter of the CDS application hook via the CDS system information manager; and
code for determining the display of the CDS system messaging in the workspace based on a determined priority of the CDS system messaging and a content of a current workspace.

14. The non-transitory computer readable media of claim 13, including code for determining the type of inputs or changes to the system information and to obtain the CDS system messaging from a database when the input or changes are present in the processing device.

15. The non-transitory computer readable media of claim 13, further comprising:
code for determining a priority level of the CDS system messaging obtained by the CDS system information manager; and
code for deciding the manner of displaying the CDS system messaging based on the determined priority level.

16. The non-transitory computer readable media of claim 15, wherein the code for determining the priority of the CDS system messaging is configured to make the determination based on at least one of metadata or coding information within the CDS system messaging.

17. The non-transitory computer readable media of claim 15, further comprising code for displaying the CDS system messaging in the workspace with an alert indicator displayed in the workspace when the determined priority level is below a predetermined threshold, wherein the alert indicator is configured to allow a user to selectively view the CDS system messaging.

18. The non-transitory computer readable media of claim 15, further comprising code for actively displaying the CDS system messaging when the determined priority level is above a predetermined threshold.

* * * * *